United States Patent
Ichikawa

(10) Patent No.: US 9,365,104 B2
(45) Date of Patent: Jun. 14, 2016

(54) PARKING ASSIST DEVICE FOR VEHICLE AND ELECTRICALLY POWERED VEHICLE INCLUDING THE SAME

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 13/635,762

(22) PCT Filed: Apr. 21, 2010

(86) PCT No.: PCT/JP2010/057047
§ 371 (c)(1),
(2), (4) Date: Sep. 18, 2012

(87) PCT Pub. No.: WO2011/132271
PCT Pub. Date: Oct. 27, 2011

(65) Prior Publication Data
US 2013/0038715 A1 Feb. 14, 2013

(51) Int. Cl.
*B60L 11/18* (2006.01)
*G05D 1/02* (2006.01)
*B60K 6/445* (2007.10)
(Continued)

(52) U.S. Cl.
CPC ............ *B60K 6/445* (2013.01); *B60L 11/1829* (2013.01); *B60L 11/1833* (2013.01); *B60L 11/1835* (2013.01); *B60W 30/06* (2013.01); *B62D 15/0285* (2013.01); *H02J 7/025* (2013.01); *B60L 11/182* (2013.01); *G05D 1/0225* (2013.01); *G05D 1/0234* (2013.01); *Y02T 10/6239* (2013.01); *Y02T 10/6269* (2013.01); *Y02T 10/7005* (2013.01); *Y02T 90/12* (2013.01);
(Continued)

(58) Field of Classification Search
CPC ............ B60L 11/1829; B60L 11/1833; B60L 11/1835; B62D 15/0285; G05D 1/0225; G05D 1/0234; Y02T 90/125
See application file for complete search history.

(56) References Cited

U.S. PATENT DOCUMENTS 4,800,328 A  1/1989 Bolger et al.
5,461,298 A  10/1995 Lara et al.
(Continued)

FOREIGN PATENT DOCUMENTS

AU  2006269374 C1  1/2007
AU  2007349874 A2  10/2008
(Continued)

OTHER PUBLICATIONS

Gomez-Bravo et al., "Parallel and diagonal parking in nonholonomic autonomous vehicles", Engineering Applications of Artificial Intelligence 14 (2001), pp. 419-434.*
(Continued)

*Primary Examiner* — Todd Melton
(74) *Attorney, Agent, or Firm* — Oliff PLC

(57) ABSTRACT

A first guidance control unit constituted of a parking assist ECU and a steering ECU guides a vehicle to a power transfer unit of a power feeding apparatus by controlling steering of the vehicle based on an image taken by a camera. When the vehicle is guided by the first guidance control unit to a predetermined position with respect to the power transfer unit, a second guidance control unit constituted of a vehicle ECU, a motor control ECU and a charging ECU performs alignment between the power transfer unit and a power reception unit by controlling speed of the vehicle based on a power receiving situation of the power reception unit.

19 Claims, 8 Drawing Sheets

(51) Int. Cl.
*B60W 30/06* (2006.01)
*B62D 15/02* (2006.01)
*H02J 7/02* (2016.01)

(52) U.S. Cl.
CPC .............. *Y02T90/121* (2013.01); *Y02T 90/122* (2013.01); *Y02T 90/125* (2013.01); *Y02T 90/14* (2013.01)

(56) References Cited

U.S. PATENT DOCUMENTS

| | | |
|---|---|---|
| 5,573,090 A | 11/1996 | Ross |
| 5,617,003 A * | 4/1997 | Odachi et al. .................. 320/108 |
| 5,654,621 A | 8/1997 | Seelig |
| 5,703,461 A | 12/1997 | Minoshima et al. |
| 5,821,731 A | 10/1998 | Kuki et al. |
| 5,850,135 A | 12/1998 | Kuki et al. |
| 6,014,597 A | 1/2000 | Kochanneck |
| 6,223,847 B1 | 5/2001 | Shimizu et al. |
| 6,934,603 B1 | 8/2005 | Kochanneck |
| 7,602,143 B2 | 10/2009 | Capizzo |
| 7,741,734 B2 | 6/2010 | Joannopoulos et al. |
| 7,880,337 B2 | 2/2011 | Farkas |
| 8,030,888 B2 | 10/2011 | Pandya et al. |
| 8,033,349 B2 * | 10/2011 | Ortmann et al. ............. 180/65.1 |
| 8,169,340 B2 | 5/2012 | Oyobe et al. |
| 8,319,376 B2 | 11/2012 | Kitamura et al. |
| 8,378,524 B2 | 2/2013 | Mita |
| 8,463,536 B2 * | 6/2013 | Yamamoto .................... 701/300 |
| 8,466,654 B2 * | 6/2013 | Cook et al. .................... 320/109 |
| 8,483,899 B2 | 7/2013 | Martin |
| 8,519,569 B2 * | 8/2013 | Shimokawa ................. 307/104 |
| 8,729,735 B2 | 5/2014 | Urano |
| 9,114,719 B1 | 8/2015 | Failing |
| 2002/0149673 A1 | 10/2002 | Hirama et al. |
| 2003/0122687 A1 | 7/2003 | Trajkovic et al. |
| 2004/0267420 A1 | 12/2004 | Tanaka et al. |
| 2005/0264432 A1 | 12/2005 | Tanaka et al. |
| 2006/0180362 A1 | 8/2006 | Yamaguchi et al. |
| 2007/0042729 A1 | 2/2007 | Baaman et al. |
| 2007/0131505 A1 | 6/2007 | Kim |
| 2007/0222542 A1 | 9/2007 | Joannopoulos et al. |
| 2008/0265684 A1 | 10/2008 | Farkas |
| 2008/0278264 A1 | 11/2008 | Karalis et al. |
| 2009/0040068 A1 | 2/2009 | Oyobe et al. |
| 2009/0096413 A1 | 4/2009 | Partovi et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2009/0299918 A1 | 12/2009 | Cook et al. |
| 2009/0313174 A1 | 12/2009 | Hafner et al. |
| 2010/0045114 A1 | 2/2010 | Sample et al. |
| 2010/0052431 A1 | 3/2010 | Mita |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171367 A1 | 7/2010 | Kitamura et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0187913 A1 | 7/2010 | Smith et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1 | 9/2010 | Oyobe et al. |
| 2010/0231053 A1 | 9/2010 | Karalis et al. |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0082612 A1 | 4/2011 | Ichikawa |
| 2011/0095618 A1 | 4/2011 | Schatz et al. |
| 2011/0127846 A1 | 6/2011 | Urano |
| 2011/0241440 A1 | 10/2011 | Sakoda et al. |
| 2011/0248674 A1 | 10/2011 | Baarman et al. |
| 2011/0254503 A1 | 10/2011 | Widmer et al. |
| 2011/0270462 A1 | 11/2011 | Amano et al. |
| 2012/0001485 A1 | 1/2012 | Uchida |
| 2012/0007549 A1 | 1/2012 | Murayama et al. |
| 2012/0043172 A1 | 2/2012 | Ichikawa |
| 2012/0091959 A1 | 4/2012 | Martin et al. |
| 2012/0098348 A1 | 4/2012 | Inoue et al. |
| 2012/0098483 A1 | 4/2012 | Patel |
| 2012/0217819 A1 | 8/2012 | Yamakawa et al. |
| 2013/0020862 A1 | 1/2013 | Miller |
| 2013/0037365 A1 | 2/2013 | Ichikawa |
| 2013/0038715 A1 | 2/2013 | Ichikawa |
| 2014/0035391 A1 | 2/2014 | Kitani |

FOREIGN PATENT DOCUMENTS

| | | |
|---|---|---|
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101277838 A | 10/2008 |
| CN | 101682216 A | 3/2010 |
| CN | 101860089 A | 10/2010 |
| DE | 102008046215 A1 | 9/2009 |
| EP | 0986034 A2 | 3/2000 |
| EP | 1 902 505 A2 | 3/2008 |
| EP | 1 930 203 A1 | 6/2008 |
| EP | 2 130 287 A1 | 12/2009 |
| IN | 735/DELNP/2008 | 5/2008 |
| IN | 6195/DELNP/2009 | 7/2010 |
| JP | A-09-102329 | 4/1997 |
| JP | A 9-213378 | 8/1997 |
| JP | A 9-215211 | 8/1997 |
| JP | A 10-117407 | 5/1998 |
| JP | A 11-001177 | 1/1999 |
| JP | A-2003-182489 | 7/2003 |
| JP | A-2004-229425 | 8/2004 |
| JP | A 2004-291865 | 10/2004 |
| JP | A 2005-80324 | 3/2005 |
| JP | A-2005-512893 | 5/2005 |
| JP | A 2006-288034 | 10/2006 |
| JP | A 2007-097345 | 4/2007 |
| JP | A-2007-159359 | 6/2007 |
| JP | A 2008-174102 | 7/2008 |
| JP | T 2009-501510 | 1/2009 |
| JP | A-2009-106136 | 5/2009 |
| JP | 2010063245 A | 3/2010 |
| JP | A-2010-119246 | 5/2010 |
| JP | A-2010-141976 | 6/2010 |
| JP | A-2010-183813 | 8/2010 |
| JP | A-2010-206866 | 9/2010 |
| JP | A-2010-252446 | 11/2010 |
| JP | A-2011-182608 | 9/2011 |
| KR | 20080031398 A | 4/2008 |
| KR | 20100015954 A | 2/2010 |
| RU | 2297928 C1 | 4/2007 |
| WO | WO 03/055734 A1 | 7/2003 |
| WO | WO 2007/008646 A2 | 1/2007 |
| WO | WO 2008/118178 A1 | 10/2008 |

(56) References Cited

FOREIGN PATENT DOCUMENTS

| WO | WO 2009/054221 A1 | 4/2009 |
|---|---|---|
| WO | WO 2010052785 A1 | 5/2010 |
| WO | WO 2010/067763 A1 | 6/2010 |

OTHER PUBLICATIONS

Jan. 4, 2013 Office Action issued in U.S. Appl. No. 12/992,958.
Mar. 21, 2014 Notice of Allowance issued in U.S. Appl. No. 12/992,958.
Mar. 7, 2014 Office Action issued in U.S. Appl. No. 13/583,341.
Jun. 12, 2013 Office Action issued in U.S. Appl. No. 12/992,958.
May 4, 2012 Office Action issued in Russian Patent Application No. 2011122824/11 (033848) (with translation).
A. Kurs et al., "Wireless Power Transfer via Strongly Coupled Magnetic Resonances," *Science*, Jul. 6, 2007, vol. 317, pp. 83-86.
Aug. 27, 2014 Office Action issued in U.S. Appl. No. 13/583,341.
Sep. 10, 2014 Office Action issued in U.S. Appl. No. 13/504,806.
Jan. 8, 2015 Notice of Allowance issued in U.S. Appl. No. 13/583,341.
Mar. 26, 2015 Office Action issued in U.S. Appl. No. 13/504,806.
U.S. Appl. No. 14/734,500, filed Jun. 9, 2015 in the name of Shinji Ichikawa.
Dec. 9, 2011 Office Action issued in Japanese Patent Application No. 2010-058793.
Dec. 9, 2011 International Search Report issued in PCT/IB2011/000502.
Jul. 9, 2012 Written Opinion issued in PCT/IB2011/000502.
Jun. 2, 2015 Office Action issued in U.S. Appl. No. 14/324,830.
Dec. 15, 2015 Office Action issued in U.S. Appl. No. 14/324,830.
Feb. 12, 2016 Office Action issued in U.S. Appl. No. 13/504,806.

\* cited by examiner

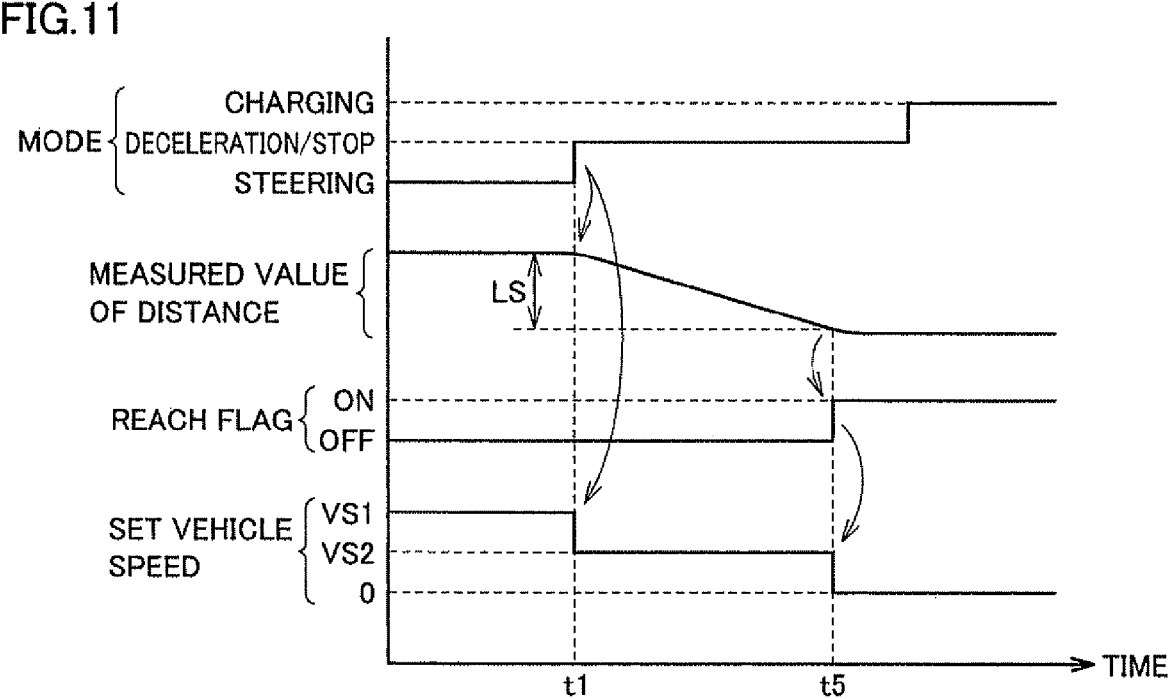

PARKING ASSIST DEVICE FOR VEHICLE AND ELECTRICALLY POWERED VEHICLE INCLUDING THE SAME

TECHNICAL FIELD

The present invention relates to a parking assist device for a vehicle and an electrically powered vehicle including the same, and more particularly to a parking assist device for a vehicle in which electric power transferred from a power transfer unit of a power feeding apparatus provided outside of the vehicle can be received by a power reception unit in a contactless manner and stored in a power storage device, and an electrically powered vehicle including the same.

BACKGROUND ART

Japanese Patent Laying-Open No. 2007-97345 (Patent Literature 1) discloses a parking assist device that allows for easy charging. This parking assist device includes a touch display having a display unit for displaying a situation around a vehicle and an input unit through which a target parking position of the vehicle is entered, and also includes a control device for performing parking assist control by calculating a route in accordance with the target parking position. The control device further performs, under predetermined conditions, alignment assist control between a vehicle-side power transfer/reception unit provided on the vehicle and an equipment-side power transfer/reception unit of equipment provided on the ground. Preferably, the parking assist device further includes a back monitor camera for taking an image of the situation around the vehicle. If an identifier indicating the equipment-side power transfer/reception unit is present in the vicinity of the target parking position in the surrounding situation whose image has been taken, the control device recognizes a position of the identifier and performs the alignment assist control.

According to this parking assist device, a driver can readily perform charging, and feels less troublesome when performing the charging. Accordingly, this device is expected to contribute to the spread of vehicles that need to be charged (see Patent Literature 1).

CITATION LIST

Patent Literature

PTL 1: Japanese Patent Laying-Open No. 2007-97345
PTL 2: Japanese Patent Laying-Open No. 2004-291865
PTL 3: Japanese Patent Laying-Open No. 2006-288034

SUMMARY OF INVENTION

Technical Problem

Wireless electric power transfer without a power cord or a power transfer cable has been receiving attention in recent years as a method of feeding electric power from a power feeding apparatus to a vehicle that needs to be charged. Electric power transfer using electromagnetic induction, electric power transfer using a microwave, and electric power transfer by resonance are three dominant techniques known for wirelessly transferring electric power.

Of these techniques, resonance is a technique of transferring electric power in a contactless manner through an electromagnetic field (near field) by resonating a pair of resonators (e.g., a pair of self-resonant coils) with each other in the electromagnetic field, and can transfer a large amount of electric power of several kW across a relatively long distance (e.g., several meters).

In such contactless electric power feeding method, alignment between a power transfer unit of a power feeding apparatus and a power reception unit mounted on a vehicle is important in order to feed electric power efficiently. Namely, when a contactless electric power feeding method such as resonance is used to feed electric power from a power feeding apparatus to a vehicle, parking accuracy of the vehicle with respect to the power feeding apparatus is important in order to improve power feeding efficiency.

Accordingly, an object of the present invention is to improve parking accuracy of a vehicle in which electric power transferred from a power transfer unit of a power feeding apparatus provided outside of the vehicle can be received by a power reception unit in a contactless manner and stored in a power storage device, with respect to the power feeding apparatus.

Solution to Problem

According to the present invention, a parking assist device for a vehicle in which electric power transferred from a power transfer unit of a power feeding apparatus provided outside of the vehicle can be received by a power reception unit in a contactless manner and stored in a power storage device includes an image taking device, and first and second guidance control units. The image taking device takes an image of outside of the vehicle. The first guidance control unit guides the vehicle to the power transfer unit by controlling steering of the vehicle based on the image taken by the image taking device. The second guidance control unit performs alignment between the power transfer unit and the power reception unit by controlling speed of the vehicle based on a power receiving situation of the power reception unit.

Preferably, the second guidance control unit performs the alignment by controlling the speed of the vehicle, after the control of the steering by the first guidance control unit is completed.

Preferably, when the vehicle is guided by the first guidance control unit to a predetermined position with respect to the power transfer unit, the control by the first guidance control unit is switched to the control by the second guidance control unit.

Preferably, the second guidance control unit causes the vehicle to stop upon completion of the alignment between the power transfer unit and the power reception unit.

Preferably, the second guidance control unit estimates a distance between the power transfer unit and the power reception unit based on the power receiving situation of the power reception unit, and controls the speed of the vehicle based on the estimation result.

Preferably, the second guidance control unit performs the alignment by controlling the speed of the vehicle, after the control of the steering by the first guidance control unit is completed, and when the distance between the power transfer unit and the power reception unit becomes smaller than a predetermined value.

Preferably, the second guidance control unit controls the speed of the vehicle so that the vehicle is decelerated as the distance decreases.

Preferably, the second guidance control unit sets a shift position to a parking range after the vehicle stops.

Preferably, the second guidance control unit further measures a movement distance of the vehicle, and when the measurement result reaches a predetermined value, controls the speed of the vehicle so that the vehicle stops.

Moreover, according to the present invention, an electrically powered vehicle includes any of the parking assist devices described above, the power reception unit configured to receive electric power transferred from the power transfer unit of the power feeding apparatus provided outside of the vehicle in a contactless manner, the power storage device for storing the electric power received by the power reception unit, and a motor for receiving electric power supply from the power storage device to generate running torque.

Advantageous Effects of Invention

In the present invention, the steering control of the vehicle based on the image taken by the image taking device for taking an image of outside of the vehicle, and the speed control of the vehicle based on the power receiving situation of the power reception unit are separately performed. Thus, accuracy of each control is improved since both controls do not interfere with each other According to the present invention, therefore, parking accuracy of the vehicle with respect to the power feeding apparatus is improved.

BRIEF DESCRIPTION OF DRAWINGS

FIG. 11 is a waveform diagram of main signals involved with the control for avoiding overrun.

DESCRIPTION OF EMBODIMENTS

Figure 1:
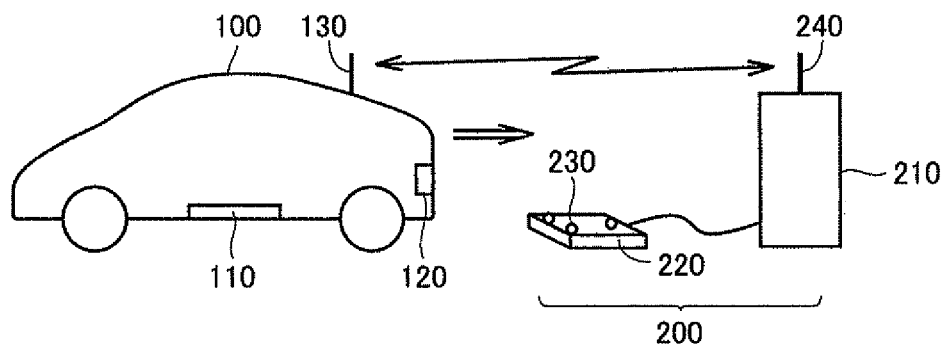
FIG. 1 is a general structure diagram of a vehicle power feeding system to which a parking assist device for a vehicle according to an embodiment of the present invention is applied.

Embodiments of the present invention will be described in detail below with reference to the drawings. It is noted that the same or corresponding parts are designated by the same reference characters in the drawings, and description thereof will not be repeated.

FIG. 1 is a general structure diagram of a vehicle power feeding system to which a parking assist device for a vehicle according to an embodiment of the present invention is applied. Referring to FIG. 1, a vehicle power feeding system 10 includes a vehicle 100 and a power feeding apparatus 200. Vehicle 100 includes a power reception unit 110, a camera 120, and a communication unit 130.

Power reception unit 110 is fixedly provided on an underbody of vehicle 100, and configured to receive electric power transferred from a power transfer unit 220 (described later) of power feeding apparatus 200 in a contactless manner. Specifically, power reception unit 110 includes a self-resonant coil (described later), and receives electric power from power transfer unit 220 in a contactless manner by resonating with a self-resonant coil included in power transfer unit 220 through an electromagnetic field. Camera 120 is provided to sense positional relation between vehicle 100 and power transfer unit 220, and built into a car body so as to be able to take an image behind the vehicle, for example. Communication unit 130 is a communication interface for conducting communication between vehicle 100 and power feeding apparatus 200.

Power feeding apparatus 200 includes a power supply device 210, power transfer unit 220, light emission units 230, and a communication unit 240. Power supply device 210 converts commercial AC electric power supplied from a system power supply, for example, into high-frequency electric power, and outputs the power to power transfer unit 220. The high-frequency electric power generated by power supply device 210 has a frequency of 1 MHz to ten or so MHz, for example.

Power transfer unit 220 is fixedly provided on a floor surface of a parking space, and configured to transfer the high-frequency electric power supplied from power supply device 210 to power reception unit 110 of vehicle 100 in a contactless manner. Specifically, power transfer unit 220 includes the self-resonant coil (described later), and transfers electric power to power reception unit 110 in a contactless manner by resonating with the self-resonant coil included in power reception unit 110 through an electromagnetic field. The plurality of light emission units 230 are provided on power transfer unit 220 to indicate a position of power transfer unit 220. Each of light emission units 230 is formed of an LED, for example. Communication unit 240 is a communication interface for conducting communication between power feeding apparatus 200 and vehicle 100.

In vehicle power feeding system 10, power transfer unit 220 of power feeding apparatus 200 transfers high-frequency electric power, and the self-resonant coil included in power reception unit 110 of vehicle 100 and the self-resonant coil included in power transfer unit 220 resonate with each other through an electromagnetic field, thereby feeding electric power from power feeding apparatus 200 to vehicle 100. In order to feed electric power efficiently from power feeding apparatus 200 to vehicle 100, alignment between power reception unit 110 of vehicle 100 and power transfer unit 220 of power feeding apparatus 200 needs to be performed by guiding vehicle 100 to power feeding apparatus 200. In this embodiment, parking control of vehicle 100 to power feeding apparatus 200 is performed in two stages.

In a first stage, vehicle 100 is guided to power transfer unit 220 of power feeding apparatus 200 by controlling steering of vehicle 100 based on an image taken by camera 120. More specifically, an image of the plurality of light emission units 230 provided on power transfer unit 220 is taken by camera 120, and positions and orientations of the plurality of light emission units 230 are recognized by image recognition. Then, positions and orientations of power transfer unit 220 and vehicle 100 are recognized based on a result of the image recognition, and steering is controlled based on the recognition result, to guide vehicle 100 to power transfer unit 220 of power feeding apparatus 200.

When the steering control is completed and vehicle 100 is guided to a predetermined position with respect to power transfer unit 220, the parking control is switched from the first stage to a second stage. In the second stage, alignment between power transfer unit 220 and power reception unit 110 is performed by feeding electric power from power transfer unit 220 to power reception unit 110, and controlling the speed of (decelerating/stopping) vehicle 100 based on a power receiving situation of power reception unit 110. More specifically, a distance between power transfer unit 220 and power reception unit 110 is estimated based on the power receiving situation of power reception unit 110. Then, the speed of vehicle 100 is controlled (decelerated/stopped) based on the estimation result, to perform alignment between power transfer unit 220 and power reception unit 110.

It is noted that electric power transferred from power transfer unit 220 in the second stage is set to be smaller than electric power supplied from power transfer unit 220 to power reception unit 110 after completion of the alignment between power transfer unit 220 and power reception unit 110. This is because the electric power transfer from power transfer unit 220 in the second stage is for the alignment between power transfer unit 220 and power reception unit 110, and thus a large amount of electric power for substantial power feeding is unnecessary.

Next, an example of a contactless electric power feeding method in vehicle power feeding system 10 will be described. In this embodiment, electric power is fed from power feeding apparatus 200 to vehicle 100 by resonance.

Figure 2:
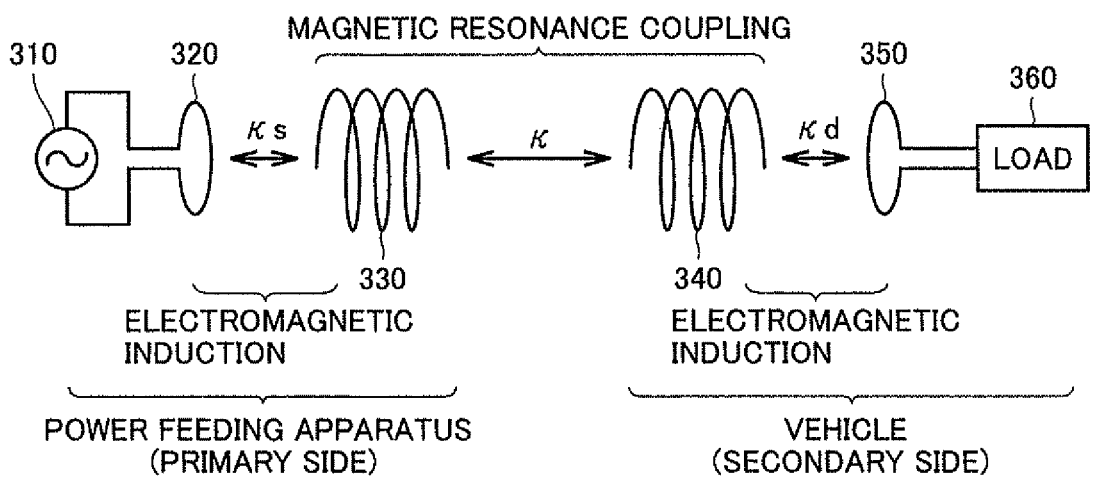
FIG. 2 is a diagram for explaining the principles of electric power transfer by resonance.

FIG. 2 is a diagram for explaining the principles of electric power transfer by resonance. Referring to FIG. 2, in this resonance, two LC resonant coils having the same natural frequency resonate with each other in an electromagnetic field (near field) in the same way that two tuning forks resonate with each other, to transfer electric power from one of the coils to the other coil through the electromagnetic field.

Specifically, a primary coil 320 is connected to a high-frequency power supply 310, and high-frequency electric power of 1 MHz to ten or so MHz is fed to a primary self-resonant coil 330 which is magnetically coupled to primary coil 320 by electromagnetic induction. Primary self-resonant coil 330 is an LC resonator having an inductance of the coil itself and a stray capacitance, and resonates with a secondary self-resonant coil 340 having the same resonant frequency as that of primary self-resonant coil 330 through an electromagnetic field (near field). Consequently, energy (electric power) is moved from primary self-resonant coil 330 to secondary self-resonant coil 340 through the electromagnetic field. The energy (electric power) moved to secondary self-resonant coil 340 is taken by a secondary coil 350 which is magnetically coupled to secondary self-resonant coil 340 by electromagnetic induction, and supplied to a load 360. Electric power transfer by resonance is implemented when a Q value indicating resonant strength of primary self-resonant coil 330 and secondary self-resonant coil 340 is greater than 100, for example.

In terms of correspondence relation with FIG. 1, secondary self-resonant coil 340 and secondary coil 350 correspond to power reception unit 110 in FIG. 1, and primary coil 320 and primary self-resonant coil 330 correspond to power transfer unit 220 in FIG. 1.

Figure 3:
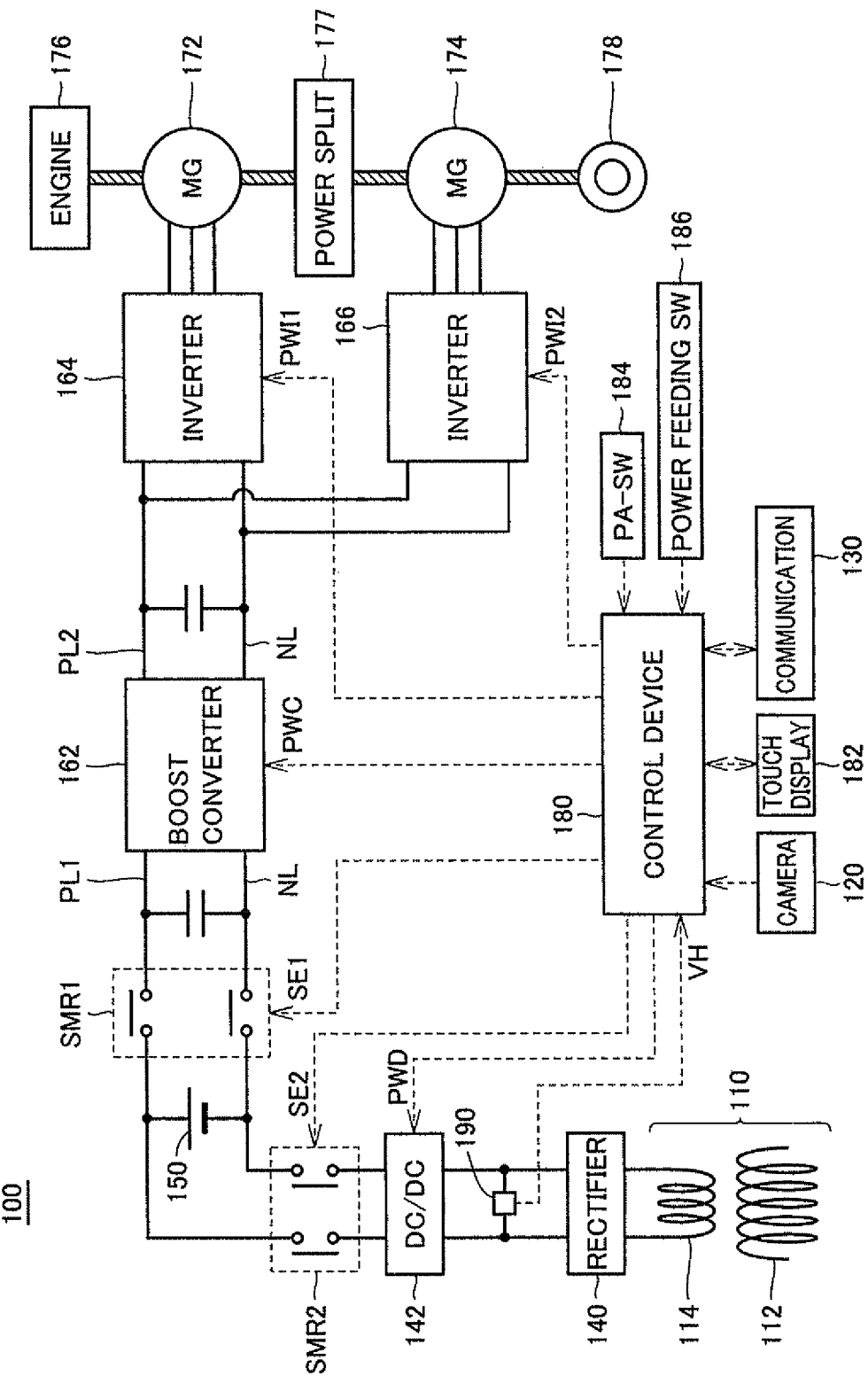
FIG. 3 is a detailed structure diagram of the vehicle shown in FIG. 1.

FIG. 3 is a detailed structure diagram of vehicle 100 shown in FIG. 1. Referring to FIG. 3, vehicle 100 includes a power storage device 150, a system main relay SMR1, a boost converter 162, inverters 164, 166, motor generators 172, 174, an engine 176, a power split device 177, and a drive wheel 178. Vehicle 100 also includes a secondary self-resonant coil 112, a secondary coil 114, a rectifier 140, a DC/DC converter 142, a system main relay SMR2, and a voltage sensor 190. Vehicle 100 further includes a control device 180, camera 120, communication unit 130, a touch display 182, a parking assist switch (hereinafter also referred to as "PA switch") 184, and a power feeding request switch 186.

Vehicle 100 incorporates engine 176 and motor generator 174 as a motive power source. Engine 176 and motor generators 172, 174 are coupled to power split device 177. Vehicle 100 runs with a driving force generated by at least one of engine 176 and motor generator 174. Motive power generated by engine 176 is split into two paths by power split device 177. Namely, one is a path for transmitting the power to drive wheel 178, and the other is a path for transmitting the power to motor generator 172.

Motor generator 172 is an AC rotating electric machine, and formed of a three-phase AC synchronous motor having a rotor in which a permanent magnet is buried, for example. Motor generator 172 generates electric power using kinetic energy of engine 176 which is split by power split device 177. When a state of charge (also referred to as "SOC," and represented in percentage with respect to a fully charged state, for example) of power storage device 150 becomes lower than a predetermined value, for example, engine 176 is started and motor generator 172 generates electric power, to charge power storage device 150.

Motor generator 174 is also an AC rotating electric machine, and as with motor generator 172, is formed of a three-phase AC synchronous motor having a rotor in which a permanent magnet is buried, for example. Motor generator 174 generates a driving force using at least one of the electric power stored in power storage device 150 and the electric power generated by motor generator 172. The driving force from motor generator 174 is transmitted to drive wheel 178.

During braking of the vehicle or during acceleration reduction on a descending slope, mechanical energy stored as kinetic energy and potential energy in the vehicle is used via drive wheel 178 to drive motor generator 174 to rotate, activating motor generator 174 to operate as a power generator. Motor generator 174 is thus activated as a regenerative brake for converting running energy into electric power to generate a braking force. The electric power generated by motor generator 174 is stored in power storage device 150.

Power split device 177 is formed of a planetary gear including a sun gear, pinion gears, a carrier, and a ring gear. The pinion gears are engaged with the sun gear and ring gear. The carrier supports the pinion gears so that they are rotatable on their own axes, and is coupled to the crankshaft of engine 176. The sun gear is coupled to the rotation shaft of motor generator 172. The ring gear is coupled to the rotation shaft of motor generator 174 and drive wheel 178.

Power storage device 150 is a rechargeable DC power supply, and formed of a secondary battery such as a lithium-ion battery or a nickel-metal hydride battery, for example. Power storage device 150 stores electric power supplied from DC/DC converter 142, and also stores regenerative electric power generated by motor generators 172, 174. Power storage device 150 supplies the stored electric power to boost converter 162. As power storage device 150, a capacitor having a large capacity can be employed, or any electric power buffer capable of temporarily storing electric power supplied from power feeding apparatus 200 (FIG. 1) and regenerative electric power from motor generators 172, 174 and supplying the stored electric power to boost converter 162 can be employed.

System main relay SMR1 is provided between power storage device 150 and boost converter 162. System main relay SMR1 electrically connects power storage device 150 to boost converter 162 when a signal SE1 from control device 180 is activated, and cuts off an electrical path between power storage device 150 and boost converter 162 when signal SE1 is deactivated. Boost converter 162 boosts, in response to a signal PWC from control device 180, a voltage of a positive electrode line PL2 to be equal to or higher than a voltage which is output from power storage device 150. Boost converter 162 is formed of a DC chopper circuit, for example. Inverters 164, 166 are provided correspondingly to motor generators 172, 174, respectively. Inverter 164 drives motor generator 172 in response to a signal PWI1 from control device 180, and inverter 166 drives motor generator 174 in response to a signal PWI2 from control device 180. Inverters 164, 166 are each formed of a three-phase bridge circuit, for example.

Secondary self-resonant coil 112 is an LC resonant coil with open (unconnected) opposing ends, and receives electric power from power feeding apparatus 200 by resonating with a primary self-resonant coil (described later) of power feeding apparatus 200 through an electromagnetic field. A capacity component of secondary self-resonant coil 112 is a stray capacitance of the coil, however, a capacitor connected across both ends of the coil may be provided. Turns of secondary self-resonant coil 112 are set as appropriate based on a distance from the primary self-resonant coil of power feeding apparatus 200, a resonant frequency of the primary self-resonant coil and secondary self-resonant coil 112 and the like, to have a large Q value (e.g., Q>100) indicating resonant strength of the primary self-resonant coil and secondary self-resonant coil 112, large K indicating a degree of coupling thereof, and the like.

Secondary coil 114 is provided coaxially with secondary self-resonant coil 112, and can be magnetically coupled to secondary self-resonant coil 112 by electromagnetic induction. Secondary coil 114 takes electric power received by secondary self-resonant coil 112 by electromagnetic induction, and outputs the power to rectifier 140. Secondary self-resonant coil 112 and secondary coil 114 form power reception unit 110 shown in FIG. 1.

Rectifier 140 rectifies the AC electric power taken by secondary coil 114. DC/DC converter 142 converts the electric power rectified by rectifier 140 into electric power having a voltage level of power storage device 150 in response to a signal PWD from control device 180, and outputs the power to power storage device 150. System main relay SMR2 is provided between DC/DC converter 142 and power storage device 150. System main relay SMR2 electrically connects power storage device 150 to DC/DC converter 142 when a signal SE2 from control device 180 is activated, and cuts off an electrical path between power storage device 150 and DC/DC converter 142 when signal SE2 is deactivated. Voltage sensor 190 detects a voltage VH between rectifier 140 and DC/DC converter 142, and outputs the detected value to control device 180.

During control of guiding and parking vehicle 100 to a desired parking position (hereinafter also referred to as "parking assist control"), touch display 182 receives information about an image taken by camera 120 from control device 180, and displays the received image information. In addition to displaying the image information, touch display 182 accepts an input from a user for determining a parking position of vehicle 100, and outputs information about the input parking position to control device 180. A display of a car navigation device can be used as touch display 182, for example.

Control device 180 generates signals PWC, PWI1, PWI2 for driving boost converter 162 and motor generators 172, 174, respectively, based on an accelerator position, vehicle speed, and other signals from various sensors, and outputs generated signals PWC, PWI1, PWI2 to boost converter 162 and inverters 164, 166, respectively. During running of the vehicle, control device 180 activates signal SE1 to turn on system main relay SMR1, and deactivates signal SE2 to turn off system main relay SMR2.

When PA switch 184 and power feeding request switch 186 are turned on by the user, control device 180 receives information about an image taken by camera 120 from camera 120, and outputs the received image information to touch display 182. Control device 180 also receives information about a parking position which is input by the user through touch display 182 from touch display 182. Control device 180 further receives a detected value for voltage VH detected by voltage sensor 190 from voltage sensor 190. Then, based on these pieces of data, control device 180 performs the parking assist control in a manner described later to guide vehicle 100 to power transfer unit 220 of power feeding apparatus 200 (FIG. 1).

When alignment between power transfer unit 220 and power reception unit 110 of vehicle 100 is completed, control device 180 transmits a power feeding instruction to power feeding apparatus 200 via communication unit 130, and activates signal SE2 to turn on system main relay SMR2. Furthermore, control device 180 generates signal PWD for driving DC/DC converter 142, and outputs generated signal PWD to DC/DC converter 142. Then, power feeding apparatus 200 starts charging power storage device 150.

PA switch 184 is a switch for the user to request parking assistance using camera 120 and touch display 182. Power feeding request switch 186 is a switch for the user to request charging of power storage device 150 by power feeding apparatus 200.

Figure 4:
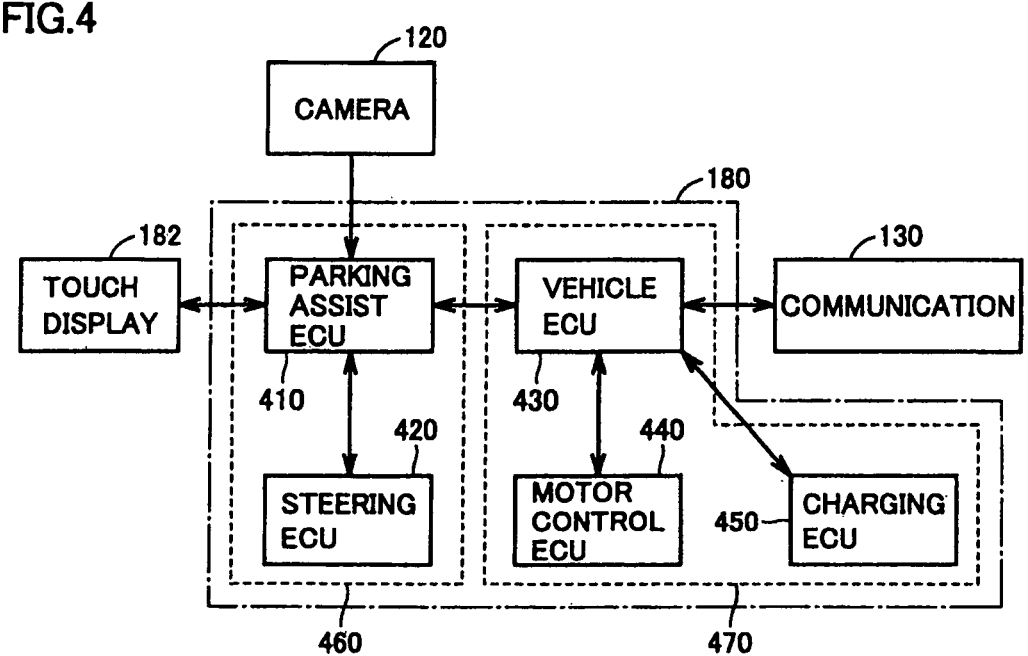
FIG. 4 is a functional block diagram of a control device shown in FIG. 3.

FIG. 4 is a functional block diagram of control device 180 shown in FIG. 3. Referring to FIG. 4, control device 180 includes a parking assist ECU (Electronic Control Unit) 410, a steering ECU 420, a vehicle ECU 430, a motor control ECU 440, and a charging ECU 450.

When not-shown PA switch 184 and power feeding request switch 186 are turned on, parking assist ECU 410 performs control for guiding vehicle 100 to power transfer unit 220 of power feeding apparatus 200 (FIG. 1) based on the image information received from camera 120.

Specifically, parking assist ECU 410 outputs the image information received from camera 120 to touch display 182, and recognizes power transfer unit 220 based on the image information. Power transfer unit 220 is provided with the plurality of light emission units 230 indicating a position and orientation of power transfer unit 220. Then, parking assist ECU 410 recognizes positional relation with power transfer unit 220 (general distance and orientation) based on the image of the plurality of light emission units 230 shown on camera 120.

In addition, parking assist ECU 410 receives the information about the parking position which is input by the user through touch display 182 from touch display 182. Then, based on the recognition result of power transfer unit 220 and the parking position information received from touch display 182, parking assist ECU 410 outputs a backing instruction to vehicle ECU 430 so that vehicle 100 will back up at a predetermined speed VS1, and outputs a steering instruction to steering ECU 420 so that vehicle 100 will be guided in an appropriate orientation to power transfer unit 220.

When the steering control is completed (i.e., a state where steering is no longer operated and the vehicle is only required to back up), and vehicle 100 is guided to the predetermined position, parking assist ECU 410 notifies vehicle ECU 430 of that situation. By way of example, the predetermined position may be a position where power transfer unit 220 falls outside of an image taking range of camera 120 by a predetermined amount due to approach of vehicle 100 to power transfer unit 220. Steering ECU 420 actually performs automatic control of steering based on the steering instruction received from parking assist ECU 410.

During normal running, vehicle ECU 430 outputs a control instruction to motor control ECU 440 depending on an operation situation of an accelerator pedal/brake pedal, a running situation of the vehicle and the like.

During the parking assist control, vehicle ECU 430 generates, in response to the backing instruction from parking assist ECU 410, a signal for driving motor generator 174 (FIG. 3) so that the vehicle will back up at speed VS1, and outputs the signal to motor control ECU 440.

Then, in response to the notification from parking assist ECU 410 that vehicle 100 has been guided to the predetermined position with respect to power transfer unit 220, vehicle ECU 430 controls the speed of (decelerates/stops) vehicle 100 based on a power receiving situation of power reception unit 110. Then, alignment between power transfer unit 220 and power reception unit 110 is performed.

Specifically, vehicle ECU 430 generates a signal for causing the vehicle to back up at a speed VS2 lower than speed VS1, and outputs the signal to motor control ECU 440. In addition, vehicle ECU 430 transmits a power feeding instruction which requests electric power transfer for alignment to power feeding apparatus 200 via communication unit 130, and receives a detected value for voltage VH (FIG. 3) indicating the receiving voltage from power feeding apparatus 200 from charging ECU 450. Then, vehicle ECU 430 estimates the distance between power transfer unit 220 and power reception unit 110 based on the detected value for voltage VH.

Figure 5:
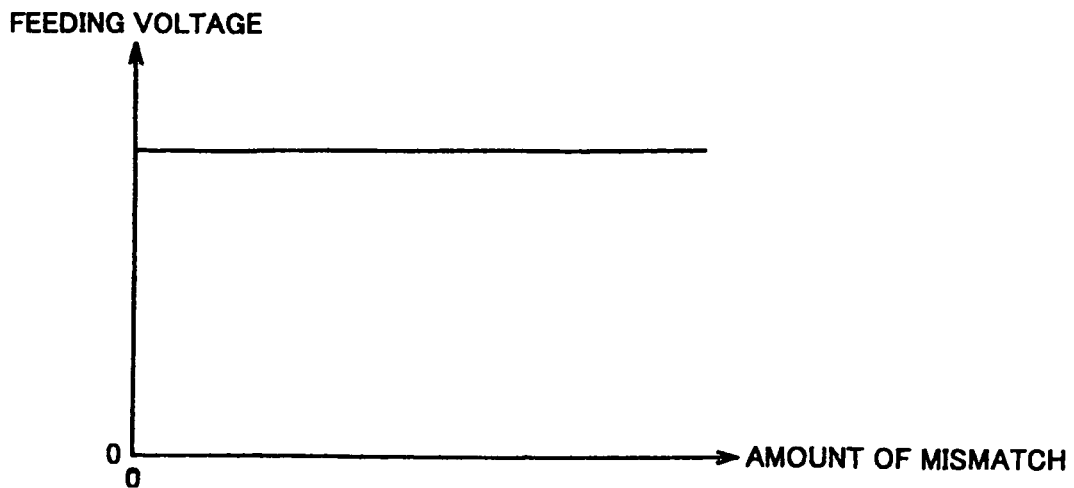
FIG. 5 is a diagram illustrating relation between the amount of mismatch of a power reception unit with respect to a power transfer unit and a feeding voltage.
Figure 6:
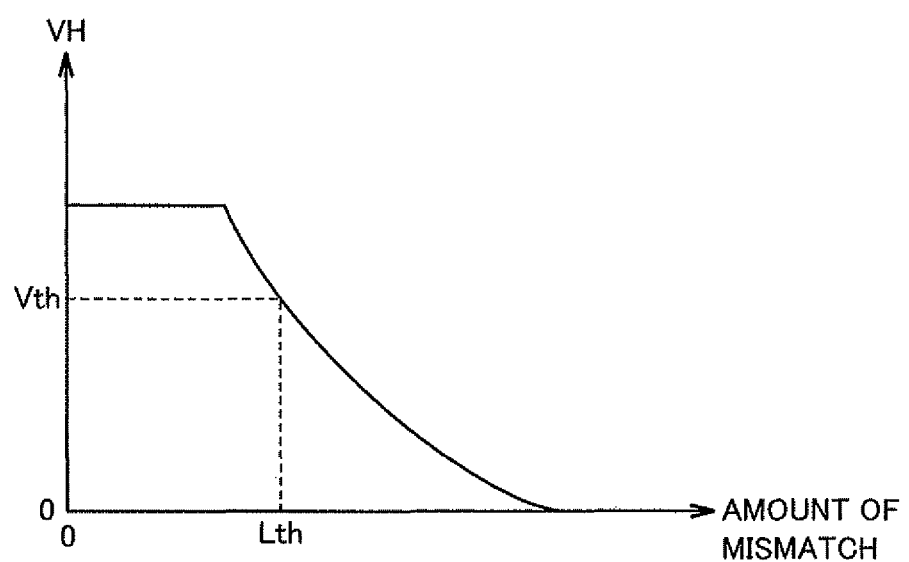
FIG. 6 is a diagram illustrating relation between the amount of mismatch of the power reception unit with respect to the power transfer unit and a receiving voltage.

That is, with respect to a constant feeding voltage (output voltage from power feeding apparatus 200) as shown in FIG. 5, voltage VH varies with the amount of mismatch between power transfer unit 220 and power reception unit 110 (the amount of mismatch is 0 when power reception unit 110 faces power transfer unit 220), as shown in FIG. 6. Thus, by measuring the relation between the feeding voltage and voltage VH (receiving voltage) shown in FIGS. 5, 6 in advance and preparing a map thereof or the like, the distance between power transfer unit 220 and power reception unit 110 can be estimated based on a detected value for voltage VH. When voltage VH exceeds a value Vth of voltage VH which corresponds to a predetermined allowable value Lth of the amount of mismatch, vehicle ECU 430 causes vehicle 100 to stop.

Referring again to FIG. 4, vehicle ECU 430 outputs, based on the estimation result of the distance between power transfer unit 220 and power reception unit 110, an instruction indicating deceleration or stop of vehicle 100 to motor control ECU 440. When the alignment between power transfer unit 220 and power reception unit 110 is completed and vehicle 100 stops, vehicle ECU 430 sets a shift position to a parking range (hereinafter also referred to as "P range"). Then, vehicle ECU 430 transmits a power feeding instruction for charging power storage device 150 to power feeding apparatus 200 via communication unit 130, and outputs an instruction indicating start of charging of power storage device 150 to charging ECU 450.

Motor control ECU 440 controls motor generators 172, 174 and boost converter 162 based on the instruction from vehicle ECU 430. Specifically, motor control ECU 440 generates signals for driving motor generators 172, 174 and boost converter 162, and outputs the signals to inverters 164, 166 and boost converter 162, respectively.

Charging ECU 450 receives the detected value for voltage V11 indicating the receiving voltage from power feeding apparatus 200 from voltage sensor 190 (FIG. 3), and outputs the received value to vehicle ECU 430. Moreover, in response to the charging start instruction from vehicle ECU 430, charging ECU 450 activates signal SE2 output to system main relay SMR2 to turn on system main relay SMR2. Then, charging ECU 450 generates a signal for driving DC/DC converter 142, and outputs the signal to DC/DC converter 142. Then, power storage device 150 is charged.

In control device 180, parking assist ECU 410 and steering ECU 420 constitute a first guidance control unit 460. First guidance control unit 460 guides vehicle 100 to power transfer unit 220 of power feeding apparatus 200 by controlling steering of vehicle 100 based on the image taken by camera 120 (steering mode). Vehicle ECU 430, motor control ECU 440 and charging ECU 450 constitute a second guidance control unit 470. Second guidance control unit 470 performs alignment between power transfer unit 220 and power reception unit 110 by controlling the speed of (decelerating/stopping) vehicle 100 based on the power receiving situation of power reception unit 110 (voltage VH) (deceleration/stop mode).

Furthermore, in control device 180, after the steering control by first guidance control unit 460 is completed (a state where steering is no longer operated and the vehicle is only required to back up), the speed control (deceleration/stop) by second guidance control unit 470 is performed. In this manner, in control device 180, the steering control based on the image from camera 120 is performed by first guidance control unit 460, and the speed control (deceleration/stop) based on the power receiving situation of power reception unit 110 is performed by second guidance control unit 470. Thus, accuracy of each control is improved since both controls do not interfere with each other, thereby improving parking accuracy.

Figure 7:
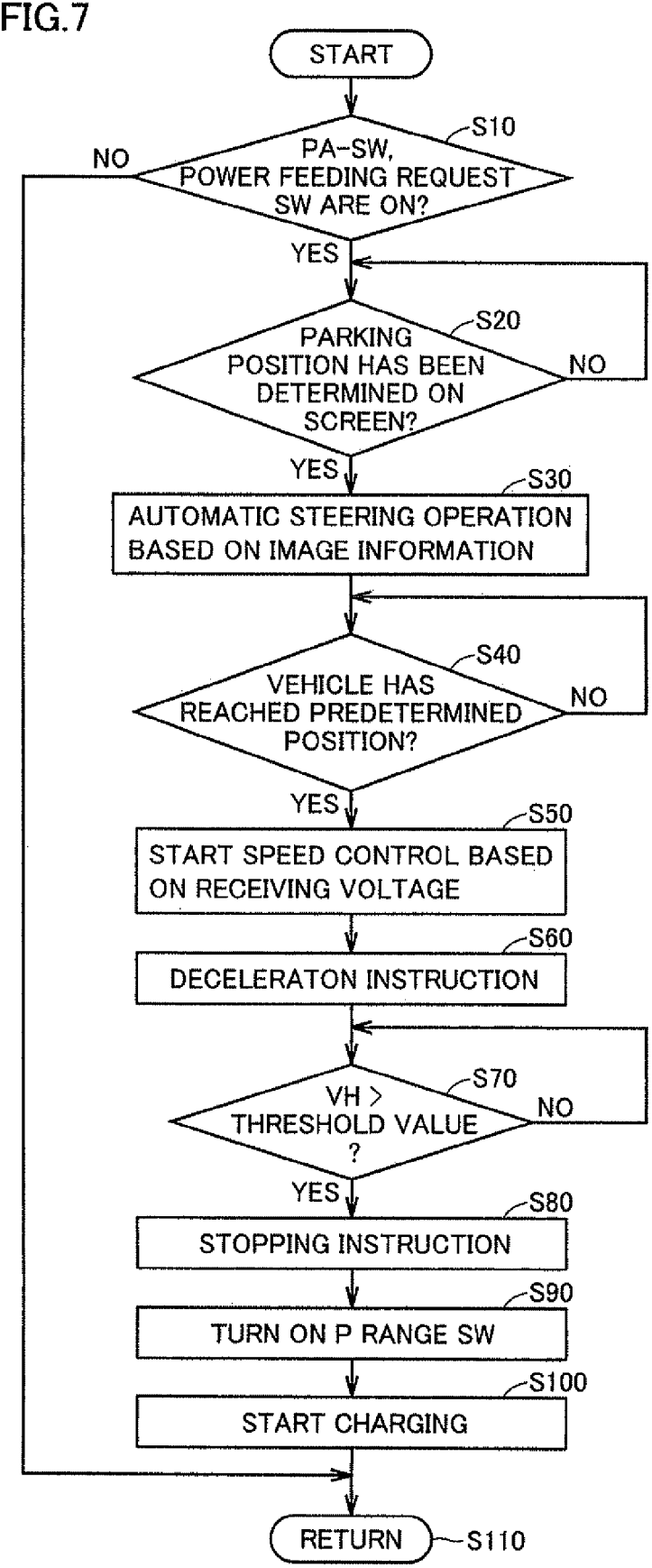
FIG. 7 is a flowchart showing a procedure of parking assist control performed by the control device shown in FIG. 3.

FIG. 7 is a flowchart showing a procedure of the parking assist control performed by control device 180 shown in FIG. 3. Referring to FIG. 7, control device 180 determines whether or not PA switch 184 and power feeding request switch 186 have been turned on by the user (step S10). If it is determined that these switches have not been turned on (NO in step S10), control device 180 proceeds to step S110 without performing a subsequent series of steps.

If it is determined in step S10 that PA switch 184 and power feeding request switch 186 have been turned on (YES in step S10), control device 180 determines whether or not a parking position of vehicle 100 has been determined by the user on a screen of touch display 182 (step S20).

If it is determined that the parking position has been determined on touch display 182 (YES in step S20), the steering mode is used as a control mode, and control device 180 performs the automatic steering operation by first guidance control unit 460 constituted of parking assist ECU 410 and steering ECU 420 based on the image information from camera 120 (step S30).

Then, control device 180 determines whether or not vehicle 100 has been guided to the predetermined position with respect to power transfer unit 220 of power feeding apparatus 200 (step S40). For example, when power transfer unit 220 shown on touch display 182 falls outside of the image taking range by the predetermined amount, it is determined that the vehicle has been guided to the predetermined position.

If it is determined in step S40 that the vehicle has reached the predetermined position (YES in step S40), the control mode is switched from the steering mode to the deceleration/ stop mode. Then, control device 180 starts the speed control (deceleration/stop) by second guidance control unit 470 constituted of vehicle ECU 430, motor control ECU 440 and charging ECU 450, based on the receiving voltage of power reception unit 110 (voltage VH) from power feeding apparatus 200 (step S50).

That is, control device 180 generates a deceleration instruction, and decelerates vehicle 100 from speed VS1 during the automatic steering operation to lower speed VS2 (step S60). Then, control device 180 determines whether or not voltage VH indicating the receiving voltage has exceeded predetermined threshold value Vth (FIG. 6) (step S70). If it is determined that voltage VH has exceeded threshold value Vth (YES in step S70), control device 180 generates a stop instruction, and causes vehicle 100 to stop (step S80).

When vehicle 100 stops, control device 180 turns on a P range switch to set the shift position to the P range (step S90). After that, control device 180 transmits a power feeding instruction to power feeding apparatus 200, and causes power feeding apparatus 200 to start charging power storage device 150 (step S100).

Figure 8:
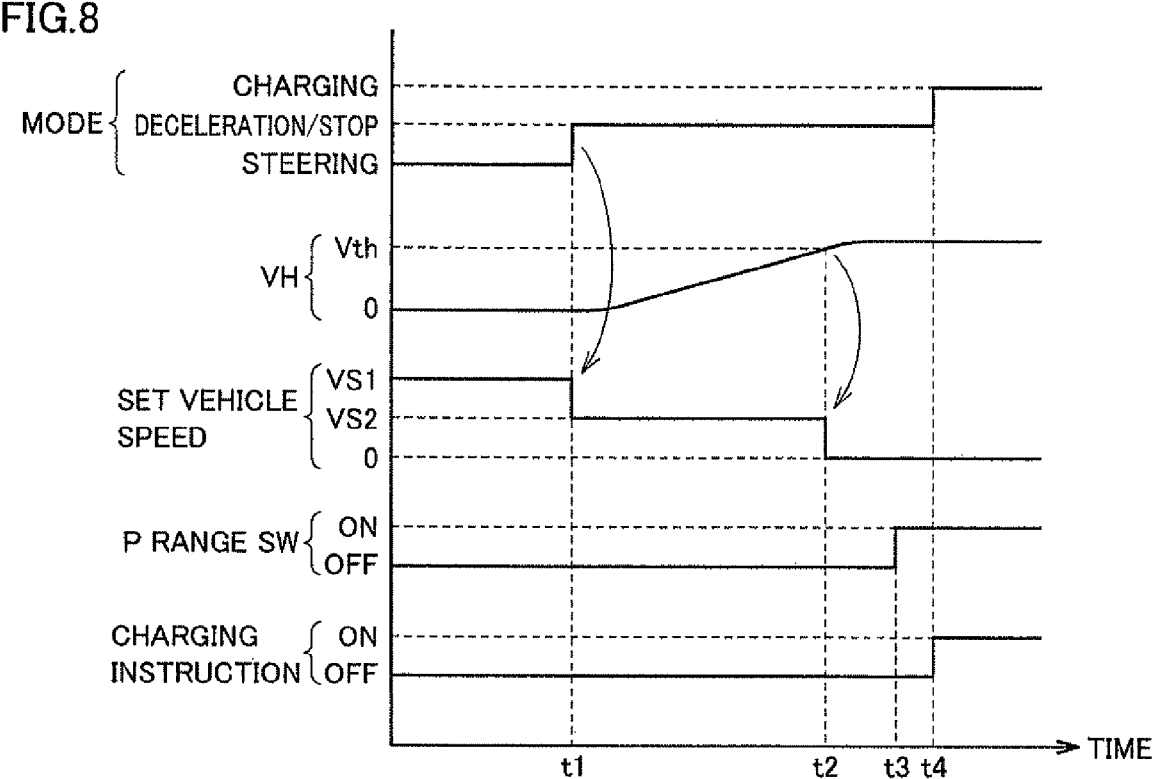
FIG. 8 is a waveform diagram of main signals during the parking assist control of a vehicle.

FIG. 8 is a waveform diagram of main signals during the parking assist control of vehicle 100. Referring to FIG. 8, before time t1, the steering control by first guidance control unit 460 (FIG. 3) is performed (steering mode). A backing speed of vehicle 100 in the steering mode is set to VS1.

When vehicle 100 is guided to the predetermined position with respect to power transfer unit 220 in the steering mode at time t1, the control mode is switched from the steering mode to the deceleration/stop mode, and the speed control of vehicle 100 by second guidance control unit 470 (FIG. 3) is performed. At this timing, the backing speed of vehicle 100 is reduced to VS2 lower than VS1.

As power reception unit 110 of vehicle 100 approaches power transfer unit 220 of power feeding apparatus 200, voltage VH indicating the receiving voltage from power feeding apparatus 200 increases. Then, when voltage VH reaches threshold value Vth at time t2, it is determined that the amount of mismatch between power transfer unit 220 and power reception unit 110 is within an allowable range, and the set vehicle speed becomes 0, causing vehicle 100 to stop.

Subsequently, at time t3, control device 180 turns on the P range switch to set the shift position to the P range. Then, at time t4, the control mode is switched from the deceleration/stop mode to a charging mode, and a charging instruction indicating charging of power storage device 150 by power feeding apparatus 200 is output.

As described above, in this embodiment, during the parking assist control, the steering control of vehicle 100 based on the image taken by camera 120 is performed by first guidance control unit 460. When vehicle 100 is guided to the predetermined position with respect to power transfer unit 220, the distance (amount of mismatch) between power transfer unit 220 and power reception unit 110 is estimated based on the power receiving situation of power reception unit 110 (voltage VH). Then, the vehicle speed is controlled by second guidance control unit 470 based on the estimation result. Thus, accuracy of each control is improved since both controls do not interfere with each other. According to this embodiment, therefore, parking accuracy of vehicle 100 with respect to power feeding apparatus 200 is improved.

Although vehicle 100 is decelerated in stages (speed VS1→VS2→0) in the above embodiment, vehicle 100 may be decelerated depending on the distance between power transfer unit 220 and power reception unit 110.

Figure 9:
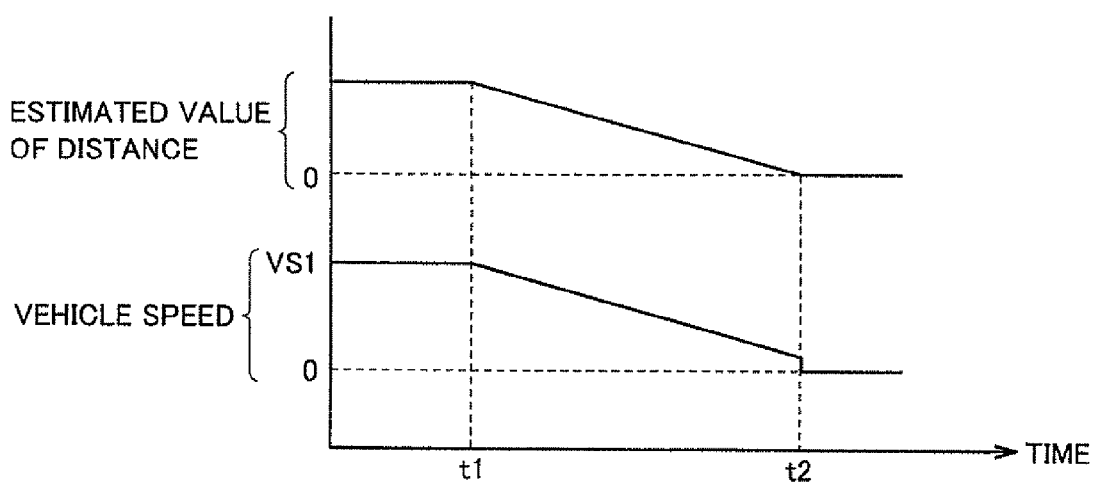
FIG. 9 is a diagram illustrating an example of a pattern of deceleration of the vehicle.

FIG. 9 is a diagram illustrating an example of a pattern of deceleration of vehicle 100. Referring to FIG. 9, as the distance between power transfer unit 220 and power reception unit 110 which is estimated based on voltage VH indicating the receiving voltage decreases, vehicle 100 is decelerated as well. Time t1 is when the control by second guidance control unit 470 is started. When the distance between power transfer unit 220 and power reception unit 110 falls within the allowable range at time t2, the vehicle speed is set to 0.

In the above description, the distance between power transfer unit 220 and power reception unit 110 is estimated based on the power receiving situation of power reception unit 110, and the speed control (deceleration/stop) of vehicle 100 is performed based on the estimation result. Here, in order to ensure that overrun of vehicle 100 is avoided, a movement distance of vehicle 100 after the speed control of vehicle 100 by second guidance control unit 470 was started may be calculated based on the vehicle speed and the like, and the vehicle may be stopped when the calculated movement distance exceeds a predetermined value.

Figure 10:
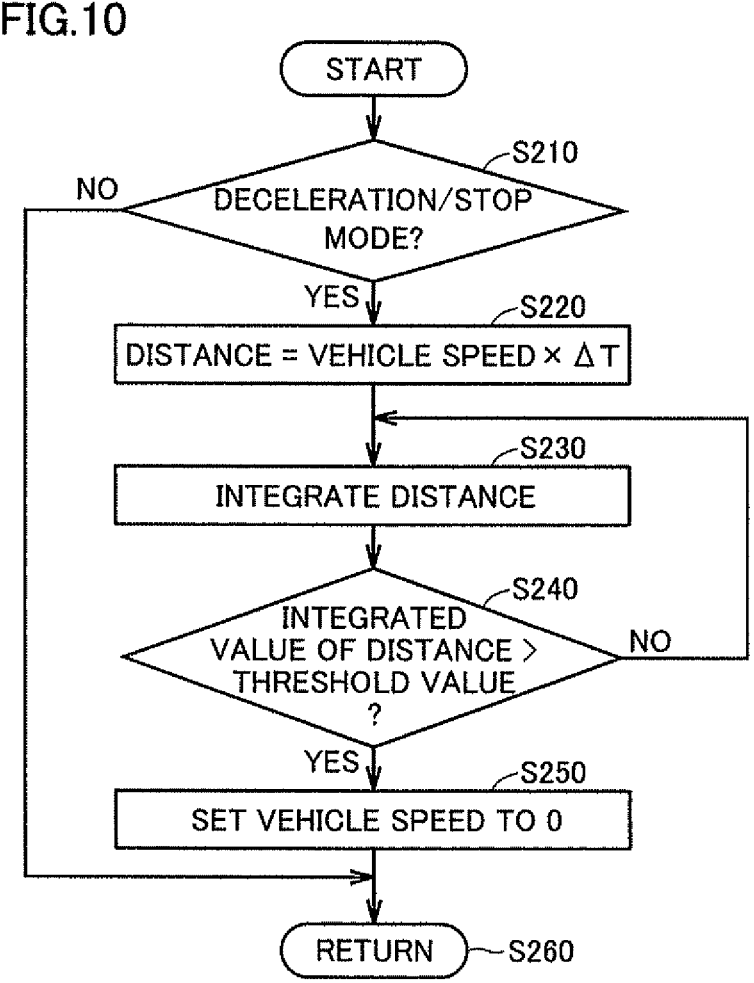
FIG. 10 is a flowchart showing a procedure of control for avoiding overrun.

FIG. 10 is a flowchart showing a procedure of control for avoiding overrun. Referring to FIG. 10, control device 180 determines whether or not the control mode is the deceleration/stop mode (step S210). If it is determined that the control mode is the deceleration/stop mode (YES in step S210), control device 180 multiplies the vehicle speed detected by a not-shown sensor or the vehicle speed calculated from the speed of motor generator 174 (FIG. 3) by an operation cycle ΔT, to calculate a movement distance of vehicle 100 during the period ΔT (step S220).

Next, control device 180 integrates the distance calculated in step S220, to calculate a movement distance of vehicle 100 after the control mode was switched to the deceleration/stop mode (step S230). Then, control device 180 determines whether or not the integrated value of the distance calculated in step S230 is larger than a predetermined threshold value (step S240). If the integrated value of the distance is equal to or smaller than the threshold value (NO in step S240), the process returns to step S230.

If it is determined in step S240 that the integrated value of the distance exceeds the threshold value (YES in step S240), control device 180 sets the vehicle speed to 0 (step S250).

FIG. 11 is a waveform diagram of main signals involved with the control for avoiding overrun. Referring to FIG. 11, when the control mode is switched from the steering mode to the deceleration/stop mode at time t1, the speed control of vehicle 100 by second guidance control unit 470 is started. Then, the set vehicle speed is switched from VS1 to VS2, and the operation of the movement distance (measured value of the distance) using the detected value (or calculated value) of the vehicle speed is started.

Then, when the measured value of the distance reaches a predetermined value LS at time t5, a reach flag is turned on and the set vehicle speed becomes 0, causing vehicle 100 to stop.

Although camera 120 is installed on the rear of the vehicle on the assumption of reverse parking of vehicle 100 with respect to power feeding apparatus 200 in the above embodiment, camera 120 may be installed on the forward of the vehicle for forward parking of vehicle 100 with respect to power feeding apparatus 200.

Although electric power is transferred in a contactless manner from power feeding apparatus 200 to vehicle 100 by resonance in the above description, a method of transferring electric power from power feeding apparatus 200 to vehicle 100 is not necessarily limited to resonance, but may be other contactless electric power transfer methods such as electric power transfer using electromagnetic induction, or electric power transfer using a microwave. Also in these electric power transfer methods, the distance between power transfer unit 220 and power reception unit 110 can be estimated based on a situation of power feeding from power feeding apparatus 200 to vehicle 100.

Although the position and orientation of power transfer unit 220 are recognized by image recognition based on light emission units 230 in the above description, the shape and the like of power transfer unit 220 may be recognized by image recognition without providing light emission units 230. By providing light emission units 230 as in the above embodiment, the position and orientation of power transfer unit 220 can be recognized at night.

Although a series/parallel hybrid car capable of splitting motive power of engine 176 by power split device 177 to transmit the resultant power to drive wheel 178 and to motor generator 172 is described as vehicle 100 in the above description, the present invention is also applicable to other types of hybrid cars. That is, the present invention is also applicable, for example, to a so-called series hybrid car which uses engine 176 only for driving motor generator 172 and generates a driving force of the car only by motor generator 174, to a hybrid car in which only regenerative energy out of kinetic energy generated by engine 176 is recovered as electric energy, to a motor-assisted hybrid car in which an engine is used for main motive power and a motor assists the engine as necessary, and the like.

The present invention is also applicable to an electric vehicle which does not include engine 176 and runs only with electric power, and to a fuel cell car which includes a fuel cell in addition to power storage device 150 as a DC power supply. The present invention is also applicable to a vehicle which does not include boost converter 162, and to a vehicle which does not include DC/DC converter 142.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST

10 vehicle power feeding system; 100 vehicle; 110 power reception unit; 112, 340 secondary self-resonant coil; 114, 350 secondary coil; 120 camera; 130, 240 communication unit; 140 rectifier; 142 DC/DC converter; 150 power storage device; 162 boost converter; 164, 166 inverter; 172, 174 motor generator; 176 engine; 177 power split device; 178 drive wheel; 180 control device; 182 touch display; 184 PA switch; 186 power feeding request switch; 190 voltage sensor; 200 power feeding apparatus; 210 power supply device; 220 power transfer unit; 230 light emission unit; 310 high-frequency power supply; 320 primary coil; 330 primary self-resonant coil; 360 load; 410 parking assist ECU; 420 steering ECU; 430 vehicle ECU; 440 motor control ECU; 450 charging ECU; 460 first guidance control unit; 470 second guidance control unit; SMR1, SRM2 system main relay.

The invention claimed is:

1. A parking assist device for a vehicle in which electric power transferred from a power transfer unit of a power feeding apparatus provided outside of the vehicle is received by a power reception unit from below the vehicle in a contactless manner comprising:
   an image taking device for taking an image of outside of said vehicle;
   a first guidance control unit for guiding orientation of said vehicle to said power transfer unit based on the image taken by said image taking device; and
   a second guidance control unit for controlling speed of said vehicle to said power transfer unit without guiding a change in orientation of said vehicle based on a power receiving situation of said power reception unit, after the guidance by said first guidance control unit.

2. The parking assist device for a vehicle according to claim 1, wherein
   said first guidance control unit guides steering of said vehicle, and
   said second guidance control unit controls speed of said vehicle without guiding a change in steering of said vehicle.

3. The parking assist device for a vehicle according to claim 1, wherein
   said second guidance control unit controls the speed of said vehicle so that the speed of said vehicle is lower when a receiving voltage of said power reception unit is high than the speed of said vehicle when said receiving voltage is low.

4. The parking assist device for a vehicle according to claim 1, wherein
   said second guidance control unit controls the speed of said vehicle so that the speed of said vehicle decreases with an increase in receiving voltage of said power reception unit.

5. The parking assist device for a vehicle according to claim 1, wherein
   said second guidance control unit controls the speed of said vehicle so that the speed of said vehicle decreases when a receiving voltage of said power reception unit exceeds a predetermined voltage value.

6. The parking assist device for a vehicle according to claim 1, wherein
   said first guidance control unit guides the orientation of said vehicle to said power transfer unit based on a position and orientation of said power transfer unit that are recognized from the shape or arrangement of an identifier indicating the power transfer unit whose image has been taken by said image taking device.

7. The parking assist device for a vehicle according to claim 1, wherein
   said second guidance control unit controls the speed of said vehicle so that the speed of said vehicle decreases irrespective of the power receiving situation of said power reception unit when a measured movement distance of said vehicle reaches a predetermined value.

8. The parking assist device for a vehicle according to claim 1, further comprising:
   a parking assist request unit for accepting a request for parking assistance for said vehicle; and
   a power feeding request unit for accepting a request for power feeding by said power feeding apparatus, wherein
   said vehicle is guided to said power transfer unit by said first guidance control unit and said second guidance control unit when said parking assist request unit accepts said request for parking assistance and said power feeding request unit accepts said request for power feeding.

9. The parking assist device for a vehicle according to claim 1, wherein
   electric power is transferred in a contactless manner from said power transfer unit to said power reception unit differently between during the guidance by said second guidance control unit and after completion of parking assistance for said vehicle.

10. A parking assist device for a vehicle in which electric power transferred from a power transfer unit of a power feeding apparatus provided outside of the vehicle is received by a power reception unit in a contactless manner, comprising:
- an image taking device built into said vehicle so that said power transfer unit is positioned outside of an image taking range when electric power is transferred from said power transfer unit to said power reception unit after completion of parking assistance;
- a first guidance control unit for guiding orientation of said vehicle to said power transfer unit based on an image taken by said image taking device; and
- a second guidance control unit for controlling speed of said vehicle to said power transfer unit without guiding a change in orientation of said vehicle based on a power receiving situation of said power reception unit, after the guidance by said first guidance control unit.

11. The parking assist device for a vehicle according to claim 10, wherein
when said vehicle is guided by said first guidance control unit to a predetermined position with respect to said power transfer unit, the control by said first guidance control unit is switched to the control by said second guidance control unit.

12. The parking assist device for a vehicle according to claim 10, wherein
said first guidance control unit guides steering of said vehicle, and
said second guidance control unit controls speed of said vehicle without guiding a change in steering of said vehicle.

13. The parking assist device for a vehicle according to claim 10, wherein
said second guidance control unit controls the speed of said vehicle so that the speed of said vehicle is lower when a receiving voltage of said power reception unit is high than the speed of said vehicle when said receiving voltage is low.

14. The parking assist device for a vehicle according to claim 10, wherein
said second guidance control unit controls the speed of said vehicle so that the speed of said vehicle decreases with an increase in receiving voltage of said power reception unit.

15. The parking assist device for a vehicle according to claim 10, wherein
said second guidance control unit controls the speed of said vehicle so that the speed of said vehicle decreases when a receiving voltage of said power reception unit exceeds a predetermined voltage value.

16. The parking assist device for a vehicle according to claim 10, wherein
said first guidance control unit guides the orientation of said vehicle to said power transfer unit based on a position and orientation of said power transfer unit that are recognized from the shape or arrangement of an identifier indicating the power transfer unit whose image has been taken by said image taking device.

17. The parking assist device for a vehicle according to claim 10, wherein
said second guidance control unit controls the speed of said vehicle so that the speed of said vehicle decreases irrespective of the power receiving situation of said power reception unit when a measured movement distance of said vehicle reaches a predetermined value.

18. The parking assist device for a vehicle according to claim 10, further comprising:
- a parking assist request unit for accepting a request for parking assistance for said vehicle; and
- a power feeding request unit for accepting a request for power feeding by said power feeding apparatus, wherein
said vehicle is guided to said power transfer unit by said first guidance control unit and said second guidance control unit when said parking assist request unit accepts said request for parking assistance and said power feeding request unit accepts said request for power feeding.

19. The parking assist device for a vehicle according to claim 10, wherein
electric power is transferred in a contactless manner from said power transfer unit to said power reception unit differently between during the guidance by said second guidance control unit and after completion of parking assistance for said vehicle.

* * * * *